ial Office 2,834,783
Patented May 13, 1958

2,834,783
NORTROPENE AND TROPANOLS 2-SUBSTITUTED BY DIPHENYL CARBINOL

Barry M. Bloom and Gerald D. Laubach, Jackson Heights, N. Y., assignors to Chas. Pfizer & Co., Inc., Brooklyn, N. Y., a corporation of Delaware No Drawing. Application August 22, 1956
Serial No. 605,470

5 Claims. (Cl. 260—292)

This invention is concerned with a method for the preparation of certain novel tropane diphenylcarbinols and with the novel compounds so produced.

It has been found possible to prepare from an ecgonine ester, a pseudo-ecgonine ester or a norecgonidine ester, the corresponding tropane-2$\beta$-diphenylcarbinol-3$\beta$-ol, tropane-2$\alpha$-diphenylcarbinol-3$\beta$-ol, or N-nor-$\Delta^2$-tropene-2-diphenylcarbinol. The starting materials are known compounds of related structure. The tropane compounds differ only in their configuration around the 2-position carbon atom. Ecgonine and pseudo-ecgonine possess an hydroxyl group and a carboxyl group. Ecgonine and pseudo-ecgonine differ in the configuration of the hydroxyl group. Norecgonidine lacks the hydroxyl group but possesses a double bond. The hydroxyl group of the starting material for the present process may be esterified or in free form. The norecgonidine ester, of course, possesses no hydroxyl. The carboxyl group in each of the starting materials is in esterified form and it is this group which is converted to the diphenylcarbinol group by treatment with an alkali metal phenyl compound, preferably phenyl lithium, in an inert organic solvent.

Ecgonine, pseudo-ecgonine and norecgonidine are known compounds. These are prepared by methods described in the chemical literature. For instance, a pseudo-ecgonine lower alkyl ester is prepared by treatment of cocaine with an alkali metal lower alkoxide as described in the Journal of the American Chemical Society, vol. 76, p. 2855 (1954). The hydroxyl group at the 2-position may also be esterified; for instance, by reaction with an acid anhydride or acid chloride under the usual experimental conditions for esterification. Cocaine is an ecgonine ester esterified at the hydroxyl group with a benzoyl group and at the carboxyl group with a methyl group.

The process of the present invention may be represented by the following equation:

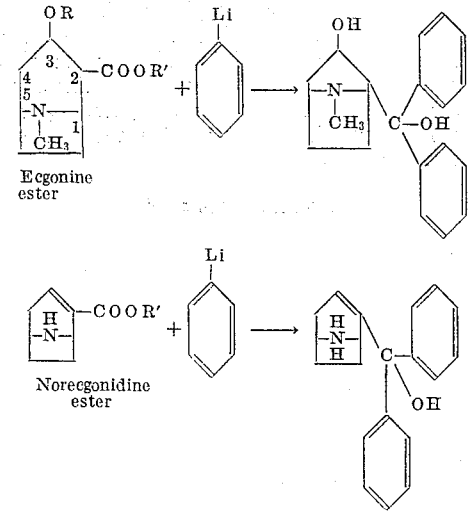

Ecgonine ester

Norecgonidine ester wherein R is hydrogen or R"CO (R"CO is a lower aliphatic acyl group having 1 to 6 carbon atoms or benzene carboxylic acid acyl group such as benzoate, toluate, etc.), R' is a lower alkyl group having from 1 to 6 carbon atoms or an aralkyl group, e. g. benzyl. If —OR is R"COO—, during the process this group becomes an hydroxy group. The 3-hydroxy group may be reesterified by reaction with an acid anhydride or acid halide, preferably a lower aliphatic acid anhydride or acid halide having from 1 to 6 carbon atoms, or an aromatic acid anhydride or acid halide. During the process the diphenylcarbinol group is not esterified since it is a tertiary hydroxyl group which is esterified with considerable difficulty.

The novel compounds of the present invention are active on the central nervous systems of animals. In addition, they are effective as diuretic agents. The compounds combine a low degree of toxicity and a high order of activity of the type indicated above. They may be administered by various routes, particularly by the oral or intramuscular route. For oral administration they may be incorporated into aqueous suspensions or into tablets. In general, a dosage of about 5 milligrams per kilogram per day is sufficient to exert the desired effect of these compounds upon an animal although a somewhat higher dosage level may sometimes be required. The activity will vary with the particular species of animal treated.

In the present application hereafter the term "ecgonine" will be used to include not only the normal but also the pseudo compound and the term "tropane-2-diphenylcarbinol-3$\beta$-ol" is intended to include both the 2$\alpha$ and 2$\beta$ compounds. The reaction process for the formation of the desired diphenylcarbinols is conducted, as noted above, in an inert organic solvent. The preferred phenyl lithium reagent may be prepared prior to the reaction by the action of lithium on bromobenzene; for instance, lithium may be suspended in an inert organic solvent, such as an ether (e. g. diethyl ether, dipropyl ether, dioxane, tetrahydrofurane, etc.) or a hydrocarbon (e. g. hexane, toluene, benzene, etc.). The lithium suspension is then treated with an equivalent amount of bromobenzene, which is gradually introduced.

Heat is evolved during this reaction, and the bromobenzene may be introduced at such a rate as to maintain a steady evolution of heat. In the case of low boiling solvents this may cause the solvent to reflux. It is advisable to continue the elevated temperature for a further brief period, that is, for one or two hours, to make certain that the reaction has been completed. A temperature of about 30° to 70° C. is satisfactory. Thereafter the phenyl lithium may be reacted with an ester of ecgonine, which if desired may also be esterified at the 3-hydroxyl group. It is preferred to use at least two molecular proportions of the phenyl lithium with a norecgonidine compound and at least three or four with an ecgonine compound. An excess of the reagent is preferably used for the reaction. If the 3-position of the ecgonine compound is esterified with a carboxylic acid, phenyl lithium will react with this ester forming the corresponding ketone. Thus, if cocaine is used, the benzoyl group at the 3-position also reacts to form benzophenone as a by-product. This may be readily separated from the desired tropane diphenylcarbinol. An excess of phenyl lithium is preferably used, that is, up to about 4 moles in excess of the two moles required to react with the ester group at the 2-position of the ecgonine compound. After the ecgonine ester is added to the phenyl lithium gradually, it is advisable to heat the reaction mixture, for instance, at a temperature of from about 30 to about 70° C. for an hour or more. Usually not greater than 5 hours heating is necessary to assure completion of the reaction. After cooling the reaction mixture, it may be worked up by adding it carefully to cold water and extracting the product with a suitable solvent, such as diethyl ether.

Separation of the product from any ketone which is formed as a by-product by reaction of the ester group at the 3-position of the ecgonine molecule, if such is present, may be achieved by extracting the crude product dissolved in an inert non-polar organic solvent, such as diethyl ether, with a dilute aqueous mineral acid solution. Other organic solvents may be used, such as dipropyl ether, benzene, toluene, etc. The product passes into the acid solution and then may be recovered, after removing any solid impurities, by cautiously adjusting the pH to an alkaline value with a reagent such as sodium bicarbonate, sodium hydroxide, potassium carbonate, and so forth. The product precipitates and may then be removed by filtration. Purification may be accomplished by extracting the product with a halogenated lower hydrocarbon such as methylene chloride, concentrating and crystallizing the purified material.

Tropane - $2\beta$ - diphenylcarbinol - $3\beta$ - ol, the product obtained as described above from cocaine, has a melting point of 188.2 to 189° C. It displayed maxima in the infrared at 2.93, 3.47, 6.27 (weak) and 6.72 microns. These values were determined with a potassium bromide pellet containing the product. The optical rotation of the product is $[\alpha]_D = -84°$ (ethanol).

Analysis.—Calcd. for: $C_{21}H_{25}NO_2$: C, 77.98; H, 7.79. Found: C, 77.52; H, 7.62.

Tropane-$2\alpha$-diphenylcarbinol-$3\beta$-ol has a melting point of 261.4 to 266.4° C. It displayed maxima in the infrared at 2.93, 3.30, 3.43, 6.65 and 6.72 microns. These values were determined with a potassium bromide pellet containing the product.

Analysis.—Calcd. for: $C_{21}H_{25}NO_2$: C, 78.0; H, 7.79; N, 4.33. Found: C, 77.9; H, 7.70; N, 4.28.

N-nor-$\Delta^2$-tropene-2-diphenylcarbinol has a melting point of 243–244° C. It has maximum in the infrared at 2.9–3.3, 6.25, 6.69 and 6.86$\mu$ when measured in a potassium bromide pellet.

The following examples are given by way of illustration and are not to be regarded as a limitation of this invention, many variations of which are possible without departing from its spirit or scope.

EXAMPLE I

*Tropane-2α-diphenylcarbinol-3β-ol*

A solution of phenyl lithium was prepared from 5 grams of lithium and 38 milliliters of bromobenzene. To the suspension of phenyl lithium was added over a period of 20 to 30 minutes a solution of 5.00 grams of pseudo-ecgonine methyl ester in dry dioxane. The reaction mixture was then heated under reflux with stirring for an additional 90 minutes. The mixture then cooled in an ice bath and 150 milliliters of water was cautiously added to decompose the organo-lithium compound. The product which separated was filtered and washed with a small volume of water. The product was then dried. It weighed 7.39 grams. This material was recrystallized from methanol and then from absolute ethanol to give analytically pure material.

EXAMPLE II

*Tropane-2α-diphenylcarbinol-3β-ol monoacetate*

Five hundred milligrams of the above carbinol was dissolved in 10 milliliters of acetic anhydride. The mixture was stored at room temperature for 5 hours. The excess anhydride and acetic acid was removed by evaporation under vacuum leaving a crystalline residue. The residue was triturated with petroleum ether and 500 milligrams of crude acetate was obtained. This product melted at 170.2° to 171.4° C. It was recrystallized from ethyl acetate-cyclohexane mixture to obtain the purified product melting at 174.8° to 175.2° C. $[\alpha]_D = +23°$ in ethanol. Maxima in the infrared at 2.9 to 3.2, 5.75 and 6.25$\mu$ when determined in a potassium bromide pellet.

EXAMPLE III

*N-nor-$\Delta^2$-tropene-2-diphenylcarbinol*

Norecgonidine ethyl ester (prepared according to Von Braun and Miller) (Ber., vol. 51, p. 235 (1918)) weighing 2.47 grams was dissolved in 30 milliliters of dry ether. This solution was added over a period of 20 minutes to a suspension of phenyl lithium which had previously been prepared from 3.0 grams of lithium metal and 23 milliliters of bromobenzene as described above. After the addition was completed, the reaction mixture was heated under reflux with stirring for an additional 100 minutes. This mixture was then cooled in an ice bath. The excess organo-lithium compound was decomposed by the cautious addition of ice water and the whole mixture was then extracted with three 200-milliliter portions of chloroform. The combined extracts were washed with water and then dried over anhydrous sodium sulfate. The solution was separated from the sodium sulfate and the solvent was distilled in vacuum. A tan powder was left as a residue. This crude product was recrystallized from a mixture of methanol and ethyl acetate. The material thus obtained, N-nor-$\Delta^2$-tropene-2-diphenylcarbinol, had a melting point of 243–244° C. It occurred as tiny prisms.

EXAMPLE IV

*Tropane-2β-diphenylcarbinol-3β-ol*

The process of Example I was repeated using cocaine in place of pseudo-ecgonine methyl ester. The crude product was extracted with dilute aqueous hydrochloric acid and chloroform. The desired carbinol dissolving in the acid and the benzophenone in the organic solvent. Purified carbinol was separated by carefully adjusting the pH of the dilute acid to an alkaline value, filtering the product and drying.

What is claimed is:

1. A compound chosen from the group consisting of tropane - $2\alpha$-diphenylcarbinol-$3\beta$-ol, tropane-$2\beta$-diphenylcarbinol-$3\beta$-ol, N-nor-$\Delta^2$-tropene-2-diphenylcarbinol, and the esters thereof.

2. Tropane-$2\alpha$-diphenylcarbinol-$3\beta$-ol.

3. Tropane-$2\beta$-diphenylcarbinol-$3\beta$-ol.

4. N-nor-$\Delta^2$-tropene-2-diphenylcarbinol.

5. A process which comprises contacting a compound chosen from the group consisting of an ecgonine 2-ester, a pseudo-ecgonine 2-ester, and a norecgonidine ester with phenyl lithium in an anhydrous solvent, treating the thus-produced condensation product with water and isolating the desired product.

No references cited.